(12) United States Patent
Kasai et al.

(10) Patent No.: US 6,609,250 B1
(45) Date of Patent: Aug. 19, 2003

(54) SOFTWARE GENERATING DEVICE

(75) Inventors: Satoshi Kasai, Ishikawa (JP); Hidehisa Wakamatsu, Kawasaki (JP); Tomomi Mikoshiba, Matsumoto (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/458,808

(22) Filed: Dec. 10, 1999

(30) Foreign Application Priority Data

Mar. 9, 1999 (JP) .............................. 11-061629

(51) Int. Cl.$^7$ ................................. G06F 9/45
(52) U.S. Cl. ..................... 717/178; 717/167
(58) Field of Search ................ 717/174, 175–176, 717/178, 167; 709/200–253

(56) References Cited

U.S. PATENT DOCUMENTS

| | | | | |
|---|---|---|---|---|
| 5,600,789 A | * | 2/1997 | Parker et al. ................. | 714/38 |
| 5,649,204 A | * | 7/1997 | Pickett ....................... | 717/167 |
| 6,002,869 A | * | 12/1999 | Hinckley .................... | 717/124 |
| 6,006,230 A | * | 12/1999 | Ludwig et al. ............... | 707/10 |
| 6,185,733 B1 | * | 2/2001 | Breslau et al. ............... | 717/167 |
| 6,199,193 B1 | * | 3/2001 | Oyagi et al. ................. | 717/101 |
| 6,408,403 B1 | * | 6/2002 | Rodrigues et al. ............ | 714/38 |

FOREIGN PATENT DOCUMENTS

| | | |
|---|---|---|
| JP | 2-105222 | 4/1990 |
| JP | 6-214768 | 8/1994 |

OTHER PUBLICATIONS

Zaremski et al., Specification Matching of Software Components, 1997, ACM, pp. 333–369.*

* cited by examiner

Primary Examiner—Kakali Chaki
Assistant Examiner—John Q. Chavis
(74) Attorney, Agent, or Firm—Staas & Halsey LLP

(57) ABSTRACT

The present invention is a software generating device for generating new software by a plurality of modules. This device includes an extraction unit analyzing specifications of software to extract necessary modules, and a retrieval unit checking whether the modules are stored in our own device and for executing a retrieving process of the modules for another device connected through a network if the modules are not stored in our own device. For this reason, modules held by the other device can be used through the network.

15 Claims, 8 Drawing Sheets

FIG. 3

<FUNCTIONAL OUTLINE>

//APPLICATION FOR DISPLAYING DATA RETRIEVED FROM DB ON LIST BOX, AND FOR REGISTERING DATA SELECTED FROM THE LIST BOX IN HOST//

<SCREEN IMAGE>

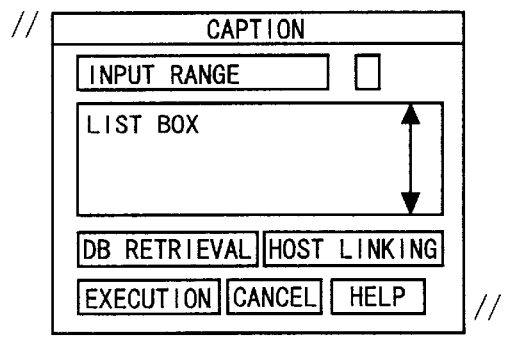

CAPTION  DATA REGISTRATION
INPUT RANGE:10, 60, 90, 10
BUTTON 1:100, 60, 10, 10
LIST BOX:10, 50, 120, 40
BUTTON 2:10, 10, 30, 10
BUTTON 3:40, 10, 30, 10

<CONFIGURATION MODULE>

[INPUT RANGE]:::SINGLE:CHARACTER:
    [BUTTON 1]:FILE LIST START:A.BMP:::
    [LIST BOX]::DATA LIST:SINGLE:CHARACTER:SCROLL
    [BUTTON 2]:DB LIST ACQUISITION:DB RETRIEVAL
    [BUTTON 3]:HOST CABINET REGISTRATION:HOST LINKING:::

---

EXPLANATION OF FUNCTIONAL SPECIFICATION FORM
FUNCTIONAL SPECIFICATION FORM IS DESCRIBED ACCORDING TO THE FOLLOWING RULES (ONLY PART OF THEM IS DESCRIBED).
· COMMENT IS SURROUNDED BY "//".
· "<", ">" ARE USED AS TAGS.
· SCREEN IMAGE DESCRIBES SCREEN TITLE, SIZE OF EACH PART, AND LOCATION (X POSITION, Y POSITION, WIDTH, AND HEIGHT).
  · EACH IS SURROUNDED BY "[", "]", AND CONTENTS OF RESPECTIVE PARTS ARE DESCRIBED SUCH THAT CONTENTS ARE SEPARATED BY ":".

FIG. 4

| ITEM NUMBER | MODULE TYPE | MODULE TITLE OR FILE NAME | MODULE SPECIFICATION 1 | MODULE SPECIFICATION 2 | MODULE SPECIFICATION 3 | DISPLAY POSITION (X, Y) | SIZE (WIDTH, HEIGHT) | KEYWORD (MODULE MAIN FUNCTION) |
|---|---|---|---|---|---|---|---|---|
| 1 | INPUT RANGE | | SINGLE | CHARACTER | | 10, 60 | 90, 10 | |
| 2 | BUTTON | a.bmp | | | | 100, 60 | 10, 10 | FILE LIST START |
| 3 | LIST BOX | DATA LIST | SINGLE | CHARACTER | SCROLL | 10, 50 | 120, 40 | |
| 4 | BUTTON | DB RETRIEVAL | | | | 10, 10 | 30, 10 | DB LIST ACQUISITION |
| 5 | BUTTON | HOST LINKING | | | | 40, 10 | 30, 10 | HOST CABINET REGISTRATION |
| • | | | | | | | | |
| • | | | | | | | | |

| KEYWORD | LIST DISPLAY | LIST ACQUISITION | INFORMATION DISPLAY | | |
|---|---|---|---|---|---|
| DIVISION PROCESS | • LIST SOURCE ACQUISITION<br>• INFORMATION DISPLAY | • LIST SOURCE open<br>• LIST INFORMATION get<br>• LIST close | • DISPLAY DEVICE open<br>• DISPLAY DEVISE output<br>• DISPLAY DEVICE close | • | • |
| | | • | • | | |
| | • | • | | | |

| PROTOCOL LENGTH | PROTOCOL IDENTIFICATION | PARTS TITLE | SPECIFICATION 1 | SPECIFICATION 2 | SPECIFICATION 3 | • • |

PROTOCOL LENGTH: BYTE LENGTH OF ENTIRE PROTOCOL
PROTOCOL IDENTIFICATION: DISCRIMINATION IDENTIFIER OF ASKING PROTOCOL/RECEPTION PROTOCOL
MODULE TITLE: TITLE OF MODULE WHOSE RETRIEVAL IS REQUESTED
MODULE SPECIFICATIONS 1 TO n: SPECIFICATION OF MODULE, KEYWORD IN RETRIEVAL

(B)

| PROTOCOL LENGTH | PROTOCOL IDENTIFIER | MODULE TITLE | MODULE BINARY |

PROTOCOL LENGTH: BYTE LENGTH OF ENTIRE PROTOCOL
PROTOCOL IDENTIFICATION: DISCRIMINATION IDENTIFIER OF ASKING PROTOCOL/RECEPTION PROTOCOL
MODULE TITLE: TITLE OF MODULE WHOSE RETRIEVAL IS REQUESTED
MODULE BINARY: ACTUAL MODULE (BINARY CODE)

SOFTWARE GENERATING DEVICE

BACKGROUND OF THE INVENTION

1. Field of the Invention

The present invention relates to a software generating device which conventional modules (program parts) are recycled.

2. Description of the Prior Art

Software (program) is to be developed, a functional specification form is analyzed first. Next, functional specifications are designed (basic design). Detail design for realizing the function designed by the basic design is performed. Coding is performed by using a predetermined development language. The software is developed through the steps described above.

For this reason, a fault (error) of the software may be frequently incorporated in the detail design or the coding. For example, during the detail design, a logic (flow chart) including a fault is designed, and coding is performed while the logic includes the fault. At this time, a program which does not operate or a program which is not matched with the function may be formed.

When a fault is included during coding, and a program formed by the coding is compiled, the program may not operate, or the expected function may not be realized.

For this reason, a fault is detected, development must be restarted from the step in which the fault is included. Therefore, an improvement in productivity cannot be achieved.

The number of steps in development in detail design or coding varies depending on the skills of a programmer. This variation may adversely affect the quality of software.

In contrast to this, a technique which achieves an improvement in productivity or quality independently of the skills of a programmer by recycling conventional modules stored in a database is known as one technique for solving the above problem.

For example, in Japanese Patent Application Laid-Open No. 2-105222, a software generating device ("Prior Art 1") for recycling conventional software to automatically generate software which is matched with specifications is disclosed. According to Prior Art 1, the corresponding relationship between modules which are adversely affected by a change in specification of the software becomes clear. For this reason, Prior Art 1 can easily cope with the change in specification of the software or addition of a specification.

In Japanese Patent Application Laid-Open No. 6-214768, a program automatic generating method ("Prior Art 2") is disclosed. In Prior Art 2, when a conventional program is recycled, processing objects in units of functions obtained by a function division result of the specifications of the conventional program and processing modules are used as one combination to generate a program. Modules in the generated program are retrieved, and a plurality of retrieved modules are synthesized with each other to generate a new program. According to Prior Art 2, a programmer can easily retrieve a target processing module from the conventional program regardless of the skills or development experiences of the programmer, and a program having newly required specifications can be efficiently generated by using a conventional program.

However, in the prior arts (Prior Art 1 and Prior Art 2) when a new program is generated, retrieval objects of conventional modules (program parts) are limited. More specifically, only modules stored in the database of our own computer are retrieved, and modules required for generation of a new program are used. For this reason, modules developed in another computer, e.g., another section or another project cannot be incorporated, and development efficiency cannot be improved.

In the prior arts, pieces of specification information must be described in all the modules, and only limited modules (i.e., modules having specifications which agree with each other) can be recycled. For this reason, an improvement in development efficiency of software is limited.

SUMMARY OF THE INVENTION

It is an object of the present invention to provide a software generating device which can recycle modules developed by another computer or the like and can use modules having different specifications.

The first aspect of the present invention is a software generating device for generating new software by a plurality of modules, including a extraction unit analyzing specifications of software to extract a necessary module, and a retrieval unit checking whether the modules are stored in our own device and executing a retrieving process of the modules for another device connected through a network if the modules are not stored in our own device (corresponding to claim 1).

According to the first aspect of the present invention, since a retrieval result of modules held by the other device can be used, the modules developed in the other device can be used.

In this case, the modules are, e.g., modules (e.g., Java applets or the like) or a group of modules. In addition, software is a module or a group of modules for realizing a certain function. The software includes an application, an operation system (OS), and the like.

The network is an internet, a LAN, a WAN, or the like. The other device is a computer such as a server, a personal computer functioning as a server or a client, a workstation, or a server machine.

The second aspect of the present invention is a software generating device for generating new software by a plurality of modules, including a extraction unit analyzing specifications of software to extract necessary modules, a division unit checking whether the modules are stored in our own device and dividing the specifications if the modules are not stored in our own device, and a retrieval unit executing a retrieving process of the modules on the basis of the divided specifications.

According to the second aspect, the following configuration can be employed. That is, the specifications are divided when our own device has no necessary module, and the corresponding module is retrieved.

According to the software generating device according to the present invention, modules developed by another computer or the like can be recycled, and even modules having different specifications can be used.

BRIEF DESCRIPTION OF THE DRAWINGS

FIG. 3 is a diagram showing a functional specification form.

FIG. 4 is a chart showing a module list table.

FIG. 5 is a chart showing a division assist table.

FIGS. 8A and 8B are diagrams of data structures transmitted/received in the retrieval asking process.

DETAILED DESCRIPTION OF THE PREFERRED EMBODIMENT

An embodiment of the present invention will be described below in detail with reference to the accompanying drawings.

<Entire Configuration>

Figure 1:
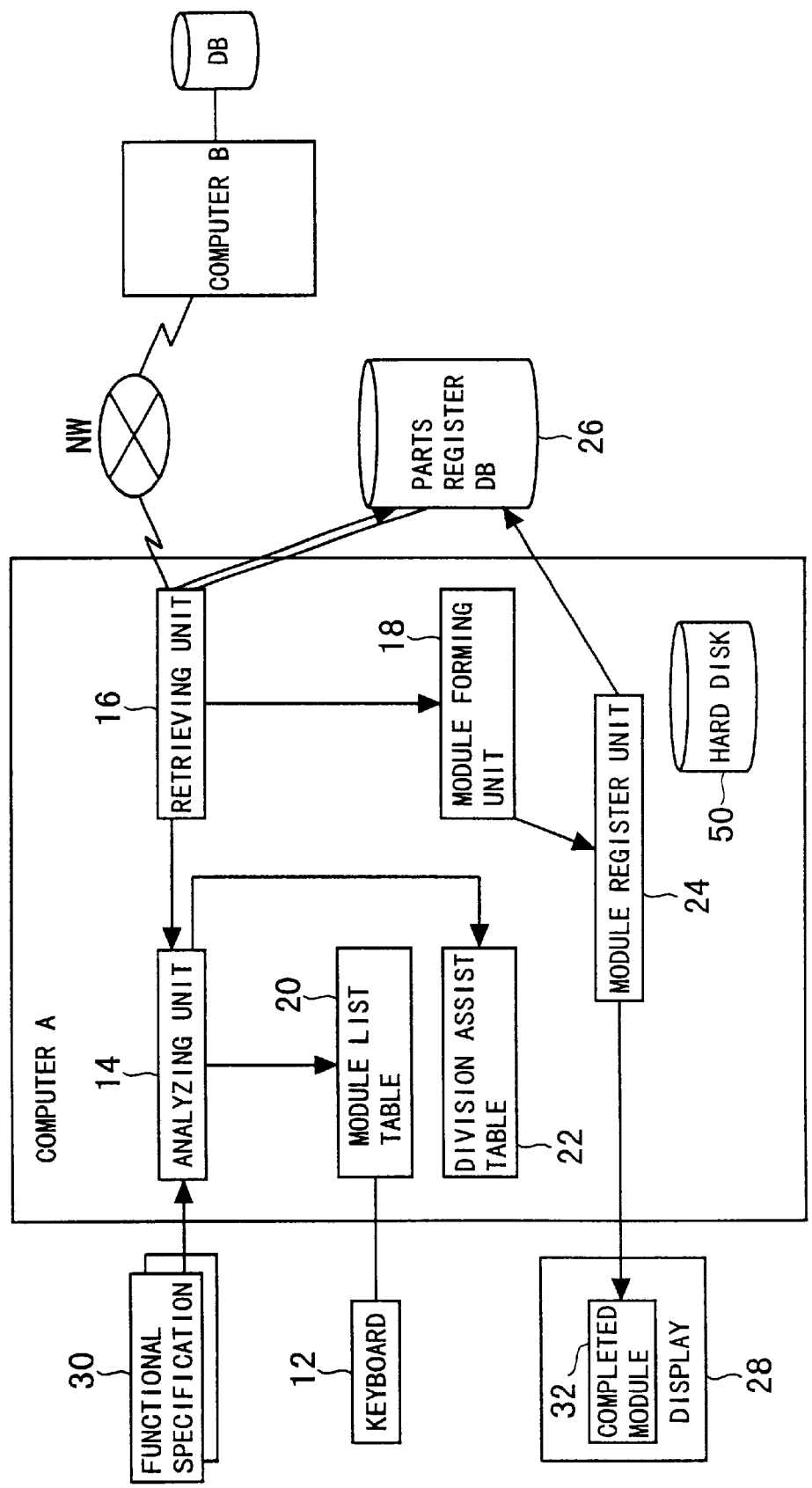
FIG. 1 is a block diagram of a software generating device according to an embodiment of the present invention.

First, the configuration of a software generating device according to an embodiment of the present invention will be described below. FIG. 1 is a block diagram of a software generating device as a whole. In FIG. 1, a computer A functioning as a software generating device is connected to a plurality of computers including a computer B through a network NW (e.g., a LAN, a WAN, or an internet) (computers other than the computer B are not shown).

The computer A is a server machine, a personal computer, or the like. The computer A comprises a keyboard 12, an analyzing unit 14, a retrieving unit 16, a module forming unit 18, a module list table 20, a division assist table 22, a module register unit 24, a database 26, and a display 28.

The analyzing unit 14, the retrieving unit 16, the module forming unit 18, and the module register unit 24 are functions which are realized such that a CPU (Central Processing Unit: not shown) constituting the computer A executes a computer programs such as an OS or an application. The module list table 20, the division assist table 22, and the database 26 are formed on a storage device (RAM, ROM, magnetic disk, photo-magnetic disk, optical disk, hard disk, magnetic tape, or the like: all of them are not shown) constituting the computer A or connected to the computer A.

The analyzing unit 14 analyzes a functional specification form 30 input through the keyboard 12 to form the module list table 20 required to realize functions (corresponding to extraction means) The analyzing unit 14 refers to the division assist table 22 when a module having a detailed specification is formed from specifications stored in the module list table 20 (corresponding to division unit).

The retrieving unit 16 retrieves the database 26 of the computer A with respect to a module, stored in the module list table 20, for realizing a certain function of functions (specifications) required for forming a new program to find the corresponding module (corresponding to retrieval unit).

When the corresponding module is not stored in the database 26 of the computer A, the retrieving unit 16 asks an agent of another computer (e.g., the computer B) connected to the network NW (corresponding to unit asking for a retrieving process) for retrieval, and receives a retrieval result (corresponding to unit receiving a retrieval result). The agent is resident in a computer as a virtual agent of a user, and is a function (or program) for performing an operation required by the user.

When modules required to realize functions shown in the functional specification form 30 can be obtained as the retrieval result, the module forming unit 18 combines these modules to each other to form a module. When the modules required to realize the functions shown in the functional specification form 30 cannot be obtained, the module forming unit 18 displays an error that the modules cannot be obtained on the display 28.

The display 28 displays input items for retrieval, the error, a completed module, or the like. Note that another output means such as a printer may be arranged in place of the display 28.

The module register unit 24 registers the formed module in the database. The module register unit 24 displays the formed module as a completed module 32 on the display 28 or outputs the formed module through a printer (not shown).

<Operation>

An operation of the software generating device will be described below.

Figure 2:
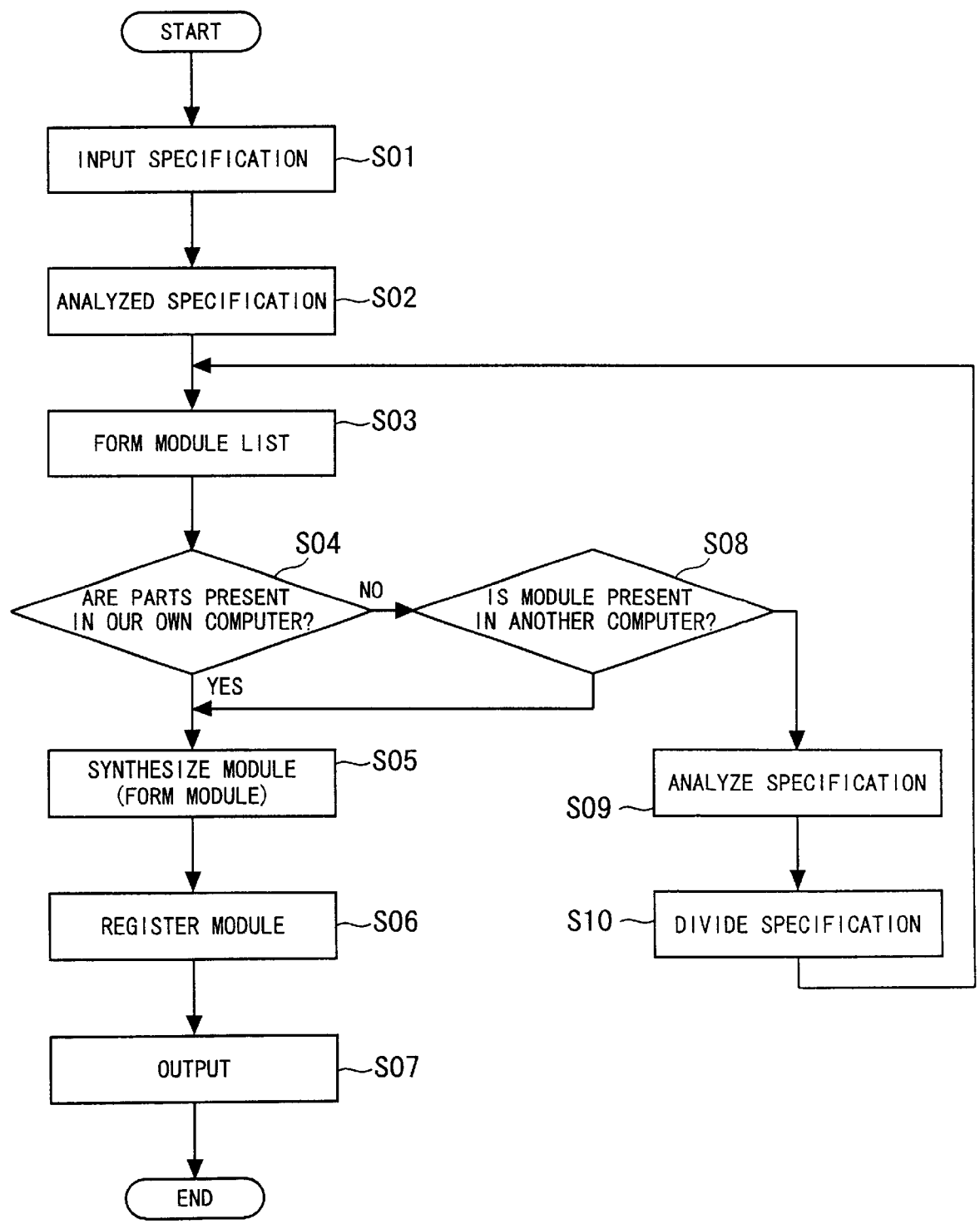
FIG. 2 is a flow chart showing processes of the software generating device according to the embodiment of the present invention.

FIG. 2 is a flow chart showing processes performed by the software generating device. A program related to the processes is stored in a hard disk 50 (corresponding to a recording medium according to the present invention) which is set such that the hard disk 50 can read/write data.

The program recorded on the hard disk 50 is executed by a CPU (not shown). The recording medium according to the present invention includes a semiconductor memory, an optical disk, a photo-magnetic disk, and a magnetic disk.

As shown in FIG. 2, when information of the specifications shown in the functional specification form 30 (S01), the analyzing unit 14 analyzes the input information of specifications (S02). Subsequently, the analyzing unit 14 forms the module list table 20 (S03). The retrieving unit 16 retrieves modules for realizing a certain function to check whether the modules are registered in the database 26 of our own computer (computer A) (S04).

When the modules for realizing a certain function are registered in the database 26 of the computer A, the module forming unit 18 combines the modules to each other to form a module (S05). The module register unit 24 registers the formed module in the database 26 (S06) to output the module as the completed module 32 (S07).

When the modules for realizing a certain function are registered in the database 26 of the computer A in step S04, the retrieving unit 16 retrieves the modules to check whether the modules are registered in the database of another computer (computer B) (S08). When the modules are registered in the database of the computer B, the processes in steps S05 to S07 are performed.

In contrast to this, when the modules are not registered in databases of any computer, the analyzing unit 14 analyzes the information of specifications which are input again (S09), and divides the specifications (functions) (S10). Thereafter, the module list table 20 of the divided specifications is formed (S03), and the processes in step S04 and subsequent steps are performed.

As described above, according to the software generating device according to this embodiment, a plurality of computers connected to each other through the network NW can share the modules. For this reason, an improvement in productivity of software is achieved.

According to the software generating device, with respect to detailed functions which are not described in the functional specification form 30, the specifications (functions) described in the functional specification form 30 can be analyzed to be divided. For this reason, when the specifications are determined, a program corresponding to the specifications can be easily formed.

<Functional Specification Form and Module List Table>

The functional specification form 30 and the module list table 20 will be described below.

FIG. 3 shows an example of the functional specification form 30, and FIG. 4 shows an example of the module list table 20. As shown in FIG. 3, in the functional specification form 30, a "functional outline (application for displaying data retrieved from a DB on a list box and for registering data selected from the list box in a host)", a "screen image", and a "configuration module (input range, button 1, list box, button 2, button 3, . . . ) are shown.

In the screen image, a screen title, the sizes of the respective modules (input range, button 1, list box, button 2, button 3, . . . ), locations (X position, Y position, width, and height), and the like are described. The contents of the configuration modules are separated from each other by ":". For example, the configuration modules are described like "file list start: A.BMP: . . . ".

The specifications (functions) described in the functional specification form 30 shown in FIG. 3 are divided, so that the module list table 20 shown in FIG. 4 is formed. The module list table 20 comprises a field representing a module type, a field representing a module title or a file name, a field representing module specification 1, a field representing module specification 2, a field representing module specification 3, a field representing a display position, a field representing a size, and a field representing a keyword (module main function).

For example, in the module of item number 3, a "list box" is set as a module type; a "data list" is set as a module title or a file name; a "single" is set as module specification 1; a "character" is set as module specification 2; "scroll" is set as module specification 3; "10, 50" is set as a display position; and "120, 40" is set as a size.

<Specification Division Process>

A specification division process executed when a module of a desired specification is not registered in databases of any computers will be described below. FIG. 5 shows an example of the division assist table 22, and FIG. 6 is a flow chart showing the specification division process.

As shown in FIG. 5, the division assist table 22 shows information used when a certain module is divided into detailed modules. The division assist table 22 comprises a field representing a keyword, a field representing a list display, a field representing list acquisition, a field representing an information display, and the like.

The specification division process is executed when a "DB list acquisition" module stored in the module list table 20 shown in FIG. 4 is not present in the database 26 shown in FIG. 1 and is not present in the databases of the other computers.

Figure 6:
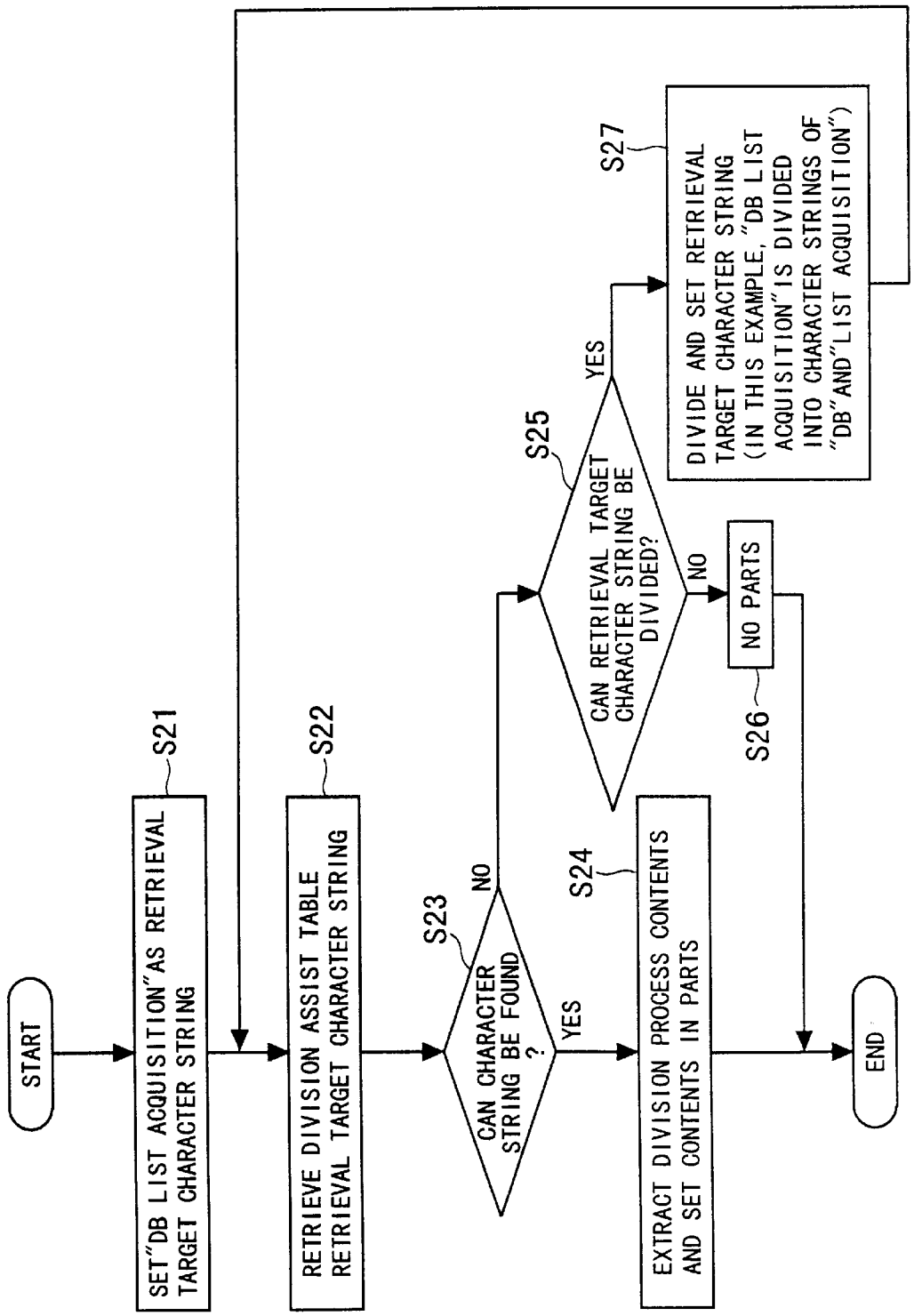
FIG. 6 is a flow chart showing a specification division process.

As shown in FIG. 6, when the specification division process is executed, first, the "DB list acquisition" is designated as a retrieval target character string (S21), and the division assist table 22 is retrieved (S22). It is checked whether a character string representing "DB list acquisition" is present in the division assist table 22 (S23). If the character string representing "DB list acquisition" is present in the division assist table 22, a "division process is read from the division assist table 22, and the read "division process" is applied to a module.

If the character string representing "DB list acquisition" is not present in the division assist table 22 in step S23, it is checked whether the character string representing "DB list acquisition" can be divided (S25). If the character string cannot be divided, the character string is handled as if no module is present (S26). Upon completion of the division process, a new module is formed as needed. In contract to this, if the character string can be divided, the "DB list acquisition" serving as a retrieval target character string is divided into, e.g., a "DB" and "list acquisition". These character strings are set in the division assist table 22 (S27).

In this manner, when the module of a desired specification is not registered in databases of any computers, the desired specification is divided into detailed specifications, and detailed modules are acquired.

<Retrieval Asking Process>

Figure 7:
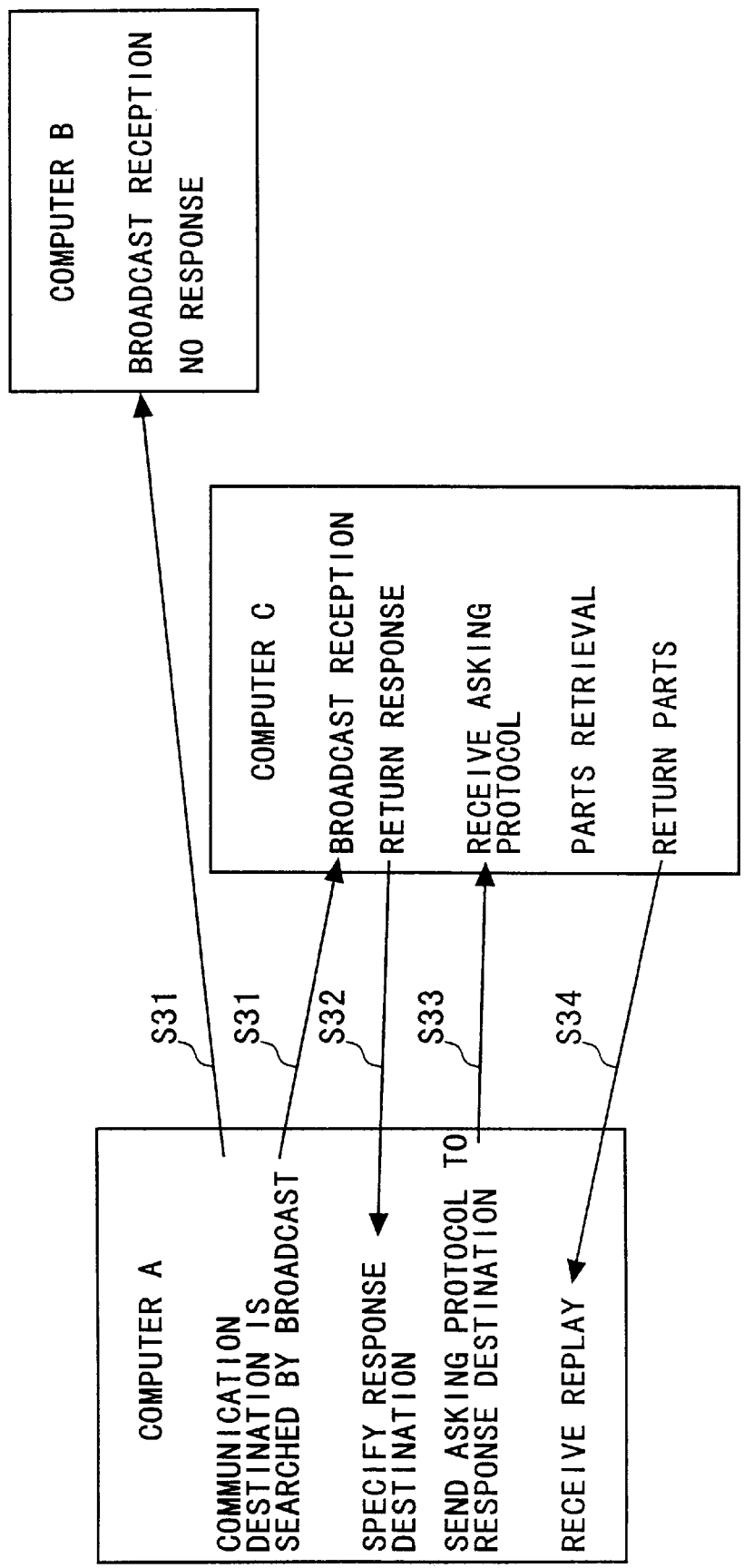
FIG. 7 is a diagram for explaining a retrieval asking process.

A retrieval asking process will be described below. The retrieval asking process is executed when the computer A does not hold a desired module. As shown in FIG. 7, the computer A serving as a retrieval asking source outputs communication requests to a plurality of computers (computer B, computer C, and the like) through broadcast (S31).

In contrast to this, for example, the computer B does not respond to the computer A. When the computer C responds to the computer A (S32), the computer A transmits a retrieval asking request (asking protocol) to the computer C (S33). When the computer C receives the retrieval asking request, the computer C retrieves a desired module (part). When the computer C holds the module, the computer C returns the module to the computer A (S34).

FIG. 8A shows the data structure of the retrieval asking request, and FIG. 8B shows the structure of data to be returned. As shown in FIG. 8A, the data (protocol) a retrieval asking request transmitted from the computer A to the computer C is constituted by a protocol length field in which the byte length of an entire protocol is stored, a protocol identification field in which a discrimination identifier of an asking protocol/reception protocol is stored, a module title field in which the title of a module whose retrieval is requested is stored, a module specification field in which the specification of a module or a keyword in retrieval is stored, and the like.

As shown in FIG. 8B, a module (protocol) transmitted from the computer C to the computer A is constituted by a protocol length field in which the byte length of an entire protocol is stored, a protocol identification field in which a discrimination identifier of an asking protocol/reception protocol is stored, a module title field in which the title of a module whose retrieval is requested is stored, a module binary field in which an actual module (binary) is stored, and the like.

The computer A for asking for retrieval transmits a retrieval asking request of the data structure shown in FIG. 8A to the computer C which accepts the asking, and the computer C finds a module corresponding to the asking, and transmits the found module to the computer A with a data structure shown in FIG. 8B.

As has been described above, according to the software generating device according to this embodiment, the step of detail design and the step of coding are automated, so that the number of steps in development is reduced. For this reason, development efficiency is improved. In addition, in the software generating device, a fault can be prevented from being incorporated in software in the steps of detail design and coding. For this reason, the quality of software is improved.

Furthermore, when a software generating device according to this embodiment is applied, a plurality of computers connected to each other through a network can share modules. For this reason, repetitive development of the same software is prevented. Therefore, the development efficiency of software is improved.

The software generating device according to this embodiment can form a detailed module which is not described in specification information on the basis of a module described in the specification information. For this reason, a formed detailed program can be incorporated in the program. Therefore, when specifications are determined, a program can be easily developed.

This embodiment described the following case. That is, when no module matched with a specification is not present in our own device or the other devices, the specification is divided into specifications, and the process of retrieving a module and the process of generating software are executed on the basis of the divided specifications. However, when it is determined that the specification is not present in our own device, the process of retrieving a module and the process of generating software based on the divided specifications may be executed.

What is claimed is:

1. A software generating device generating new software by a plurality of modules, comprising:
    an extraction unit analyzing functional specifications of software to extract necessary modules; and
    a retrieval unit checking whether the modules are stored in our own device and executing a retrieving process of the modules for another device connected through a network if the modules are not stored in our own device.

2. A software generating device according to claim 1, wherein
    the retrieval unit comprises:
        an asking unit asking the other device for a retrieving process of the modules; and
        a reception unit receiving a retrieval result depending on the asking from the other device.

3. A software generating device according to claim 1, comprising a division unit dividing the specifications if the modules extracted by the extraction unit are not present in our own device or the other device, wherein the retrieving process of the modules is executed on the basis of the divided specifications by the division unit.

4. A software generating device according to claim 3, wherein the division unit divides the specifications with reference to auxiliary information.

5. A software generating device generating new software by a plurality of modules, comprising:
    an extraction unit analyzing functional specifications of software in order to extract necessary modules;
    a division unit checking whether the modules are stored in our own device and dividing the specifications if the modules are not stored in our own device; and
    a retrieval unit executing a retrieving process of the modules on the basis of the divided specifications.

6. A software generating method for generating new software by a plurality of modules, comprising:
    inputting functional specifications of software;
    analyzing the functional specifications of software to extract necessary modules;
    checking whether the modules are stored in our own device; and
    executing a retrieving process of the modules for another device connected through a network if it is determined that the modules are not stored in our own device.

7. A software generating method according to claim 6, wherein the retrieving comprises:
    asking the other device for a retrieving process of the modules; and
    receiving a retrieval result depending on the asking from the other device.

8. A software generating method according to claim 6, further comprising dividing the specifications if the extracted modules are not present in our own device or the other device.

9. A software generating method according to claim 8, wherein the modules are divided with reference to auxiliary information.

10. A software generating method for generating new software by a plurality of modules, comprising:
    analyzing functional specifications of software to extract necessary modules;
    checking whether the modules are stored in our own device and dividing the specifications if the modules are not stored in our own device; and
    executing a retrieving process of the modules on the basis of the divided specifications.

11. A recording medium which can be read by a computer, recording a program for causing the computer to execute:
    inputting functional specifications of software;
    analyzing the input functional specifications of the software to extract necessary modules;
    checking whether the modules are stored in our own device; and
    executing a retrieving process of the modules for another device connected through a network if it is determined that the modules are not stored in our own device.

12. A recording medium, which can be read by a computer, according to claim 11, wherein the retrieving comprises:
    asking the other device for a retrieving process of the modules; and
    receiving a retrieval result depending on the asking from the other device.

13. A recording medium, which can be read by a computer, according to claim 11, recording the program further comprising dividing the specifications if the extracted modules are not present in our own device or the other device.

14. A recording medium, which can be read by a computer, according to claim 13, recording the program for dividing the modules with reference to auxiliary information.

15. A recording medium which can be read by a computer, recording a program for causing the computer to execute:
    inputting functional specifications of software;
    analyzing the input functional specifications of software to extract necessary modules;
    checking whether the modules are stored in our own device;
    dividing the specifications if it is determined that the modules are not stored in our own device; and
    executing a retrieving process of the modules on the basis of the divided specifications.

* * * * *